(12) United States Patent
Costanzo

(10) Patent No.: US 6,758,323 B2
(45) Date of Patent: Jul. 6, 2004

(54) SINGULATING CONVEYOR

(75) Inventor: Mark B. Costanzo, River Ridge, LA (US)

(73) Assignee: The Laitram Corporation, Harahan, LA (US)

( * ) Notice: Subject to any disclaimer, the term of this patent is extended or adjusted under 35 U.S.C. 154(b) by 0 days.

(21) Appl. No.: 10/158,660

(22) Filed: May 30, 2002

(65) Prior Publication Data

US 2003/0221932 A1 Dec. 4, 2003

(51) Int. Cl.[7] .............................................. B65G 47/26
(52) U.S. Cl. ........................ 198/457.02; 198/370.09; 198/461.1; 198/817; 198/833
(58) Field of Search ..................... 198/457.02, 370.09, 198/817, 461.1, 779, 790, 802, 833, 850

(56) References Cited

U.S. PATENT DOCUMENTS

| | | |
|---|---|---|
| 3,550,756 A | 12/1970 | Kornylak |
| 3,866,739 A | 2/1975 | Sikorski |
| 4,039,074 A | 8/1977 | Maxted |
| 4,231,469 A | 11/1980 | Arscott |
| 5,238,099 A | 8/1993 | Schroeder et al. |
| 5,400,896 A | 3/1995 | Loomer |
| 5,404,997 A | 4/1995 | Schrier et al. |
| 5,551,543 A | 9/1996 | Mattingly et al. |
| 5,769,204 A | 6/1998 | Okada et al. |
| 6,073,747 A | 6/2000 | Takino et al. .......... 198/370.09 |
| 6,148,990 A | 11/2000 | Lapeyre et al. |
| 6,318,544 B1 | 11/2001 | O'Connor et al. |
| 6,401,936 B1 | 6/2002 | Isaacs et al. |
| 2001/0045346 A1 | 11/2001 | Costanzo |

OTHER PUBLICATIONS

Sandvik Sorting Systems, "Singulator–Linear Singulator Flow Controller," 2001, Sandvik Sorting Systems.
09/992,765 Split Belt . . . ConvBelts.

*Primary Examiner*—Douglas Hess
(74) *Attorney, Agent, or Firm*—James T. Cronvich

(57) ABSTRACT

A singulating conveyor for aligning a mass of conveyed articles into a single file. The conveyor includes a first centering conveying zone in which one or more roller-top conveyor mats direct conveyed articles sidewise toward a side or the center of the zone. The rollers on which the articles ride rotate about axes oblique to the conveying direction to provide a sidewise component of motion to the articles. The articles are received downstream in a second separation zone, in which the articles are sped up in the conveying direction to separate them into a single file. The conveyor mats can be realized as endless conveyor belts in motion or as stationary mats overlying a moving belt contacting and rotating the rollers.

49 Claims, 7 Drawing Sheets

SINGULATING CONVEYOR

BACKGROUND

This invention relates to power-driven conveyors and, more particularly, to singulating conveyors including conveyor mats with article-supporting rollers for aligning a mass of conveyed articles into a single file.

Conventional singulating conveyors, or unscramblers, comprise a series of power-driven rollers arranged at an angle relative to a conveying direction. The rollers impart a component of force to conveyed articles transverse to the conveying direction. This transverse component of force pushes the articles toward one side of the conveyor as the flow of articles proceeds in the conveying direction. In some roller singulators, the articles are justified against a side wall; in other roller singulators, the articles are pushed to the center between two side-by-side beds of oppositely directed rollers. Rollers farther downstream rotate at higher speeds to separate articles from each other. But one of the problems with roller conveyors is that these all-metal conveyors can be noisy, especially as their bearings wear. Frequent maintenance, such as lubricating and tightening, and repair are a way of life with roller conveyors.

Conveyor belts, or chains, are used in unscramblers. In a conventional unscrambler, parallel side-by-side conveyor belts run at the same or progressively increasing speeds from belt to belt. A bar mounted at an angle to span the side-by-side belts deflects products and guides them along the bar toward a narrow single-file conveyor belt. But these belt conveyors are useful only for upstanding articles of known shape. Thin articles, such as mail envelopes or small packages, can wedge between the deflection bar and damage themselves or the conveyor. That's why powered roller conveyors are used instead to singulate articles in the package-handling industry.

As these shortcomings of conventional roller singulators and belt unscramblers suggest, there is a need for a singulating conveyor that is less noisy than roller conveyors, yet capable of handling thin conveyed articles such as envelopes and small packages of various sizes.

SUMMARY

These needs and others are satisfied by a singulating conveyor embodying features of the invention. One version of conveyor includes a first conveyor mat that extends in a lengthwise direction from a first end to a second end, in a widthwise direction from a first side to a second side, and in thickness from a top surface to a bottom surface. The first conveyor mat has a plurality of cavities opening onto its top and bottom surfaces. A roller is disposed in each cavity. Salient portions of each roller extend from the cavity past the top and bottom surfaces. Each roller is arranged to rotate about an axis oriented between the lengthwise and widthwise directions of the mat. A roller bearing surface disposed along the bottom surface of the first conveyor mat contacts the rollers. Relative motion between the rollers and the roller bearing surface causes the rollers to rotate and provide a sidewise component of motion to articles conveyed atop the rollers along the top surface of the first conveyor mat. A second conveyor mat adjacent to the first conveyor mat is arranged to receive articles from the first conveyor mat and to convey the articles at an increased speed in the lengthwise direction. Thus, the articles are aligned on the first conveyor mat and separated in the lengthwise direction along the conveyor carryway.

Another version of a conveyor suitable for singulating articles in a conveying direction comprises a first conveying zone and a second conveying zone downstream of the first conveying zone. A first conveyor mat in the first zone has rollers for supporting conveyed articles. The rollers are arranged to rotate about axes oblique to the conveying direction to provide a sideward component of motion transverse to the conveying direction. A second conveyor mat in the second conveying zone provides a component of motion in the conveying direction to the articles received from the first conveying zone. The component of motion in the conveying direction is greater in the second zone than in the first zone.

Yet another version of conveyor includes a centering belt and a separation belt. The centering belt has a central axis in the conveying direction that divides the belt into a left portion and a right portion. Rollers in the left portion are arranged to rotate about axes forming first acute angles with the central axis measured counterclockwise from the central axis. Rollers in the right portion are arranged to rotate about axes forming second acute angles with the central axis measured clockwise from the central axis. The separation belt is arranged downstream of the centering belt and operates at a speed sufficient to convey articles in the conveying direction faster than the articles proceed on the centering belt.

Still another version of conveyor includes a centering belt and a separation belt. The centering belt has rollers arranged to rotate about oblique axes as the belt travels in the conveying direction to direct conveyed articles toward a central axis of the belt. The separation belt, which is downstream of the centering belt, is operated at a speed sufficient to speed up the articles received from the centering belt and to separate them in the conveying direction.

In another version of singulator, the conveyor has first and second roller-top belts. The first roller-top belt lies on a first side of a conveyor centerline, and the second roller-top conveyor belt lies on the opposite second side of the centerline. Rollers in the first roller-top belt are arranged to rotate about axes parallel to a first oblique axis relative to the conveying direction. Rollers in the second roller-top belt are arranged to rotate about axes parallel to a second oblique axis. The roller arrangement is such that the rollers direct conveyed articles toward the centerline. A separation belt arrangement, downstream of the roller-top belts, is operated at a speed sufficient to speed up the conveyed articles to separate them in the conveying direction.

In one or more of these described versions, the conveyor mats may be stationary with a moving belt underneath to contact the rollers and rotate them. In other versions, the conveyor mats are conveyor belts driven in the direction of belt travel.

BRIEF DESCRIPTION OF THE DRAWINGS

These and other features, advantages, and aspects of the invention are described in more detail in the following description, appended claims, and accompanying drawings in which:

DETAILED DESCRIPTION

Figure 1:
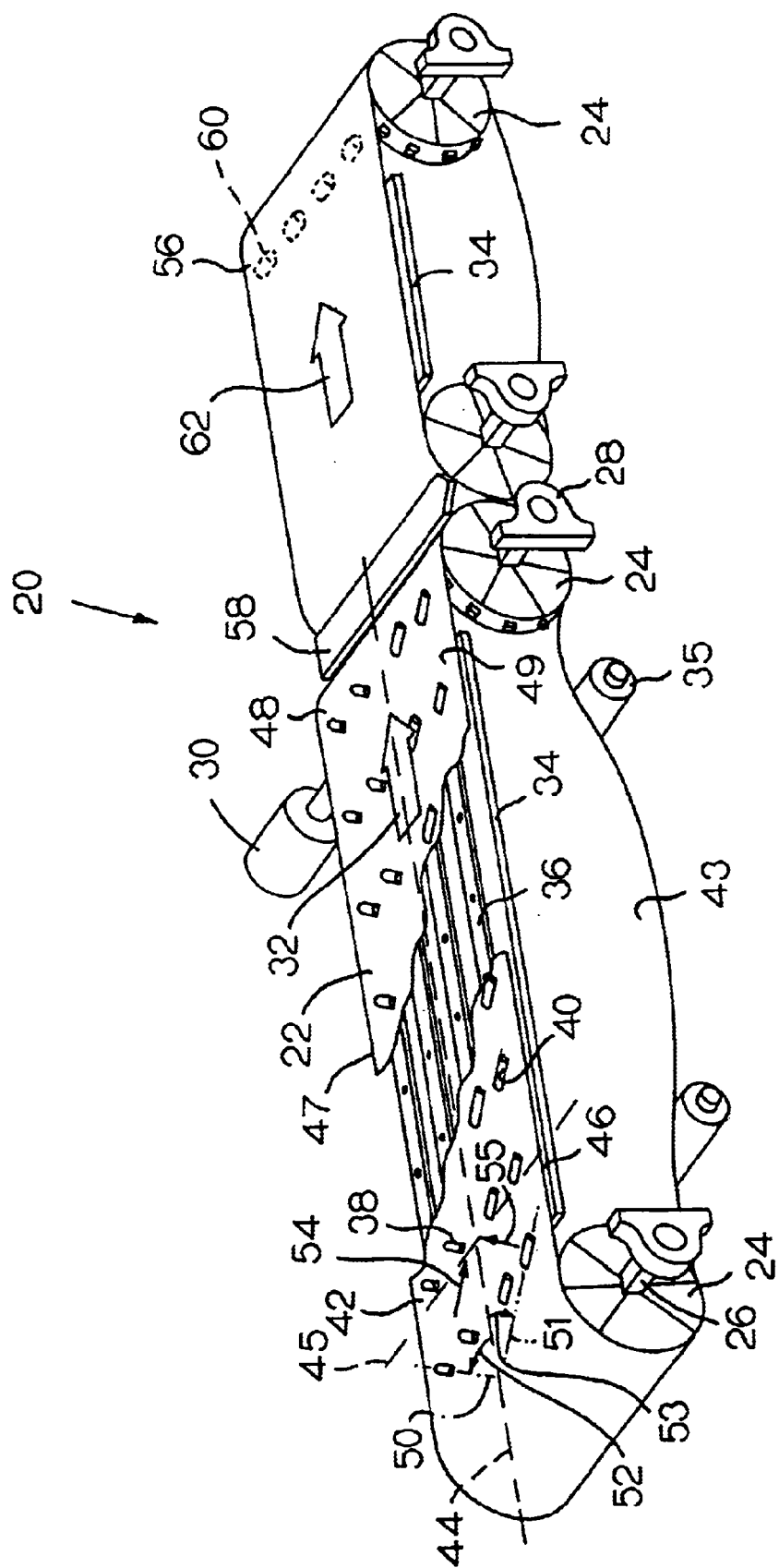
FIG. 1 is an isometric view, partly cut away, of a portion of a singulating conveyor embodying features of the invention.

An exemplary version of a conveyor suitable for singulating conveyed articles and embodying features of the invention is shown in FIG. 1. The conveyor 20 includes a first conveyor mat 22 supported in a conveyor frame. The first conveyor mat is, in this example, an endless conveyor belt looped around pulleys or sprocket sets 24, which are mounted on shafts 26 rotatably supported in bearing blocks 28 attached to the conveyor frame. A motor 30 coupled to the shaft at one end of the conveyor mat drives the mat in the conveying direction indicated by arrow 32. No motor is shown coupled to the shaft at the other end. That shaft is an idler shaft. The first conveyor mat is supported along the carryway on a conveyor pan 34 mounted in the conveyor frame. Shoes or rolls 35 reduce the sag in the mat in the returnway path. Wearstrips 36 attached to the pan form lanes running in the lengthwise direction of the conveyor. The wearstrips could alternatively be formed as a sheet covering all or most of the conveyor pan.

The first conveyor mat includes a plurality of rollers 38 that reside in cavities 40 formed in the conveyor mat. The cavities open onto the top surface 42 and the bottom surface 43 of the first conveyor mat. Salient portions of the rollers extend beyond the top and bottom surfaces of the mat. Conveyed articles ride atop the rollers on the top surface along the carryway. The wearstrips, which act as roller bearing surfaces, are arranged to contact and support the rollers extending through the bottom surface of the first conveyor mat along the carryway. As the first conveyor mat is driven in the conveying direction, the relative motion between the mat and the wearstrips causes the rollers to rotate. The rollers are arranged to provide a sidewise component of motion to conveyed articles to direct them toward a central axis 44, in this example, the centerline, of the first conveyor mat halfway between the first and second sides 46, 47 defining the width of the mat. As shown, the central axis divides the first conveyor mat into a left portion 48 and a right portion 49. The rollers on the left portion rotate about a first oblique axis 50 that lies between the central lengthwise axis 44 and the transverse widthwise direction 45. The rollers in the right portion rotate about a second oblique axis 51 that also lies between the lengthwise and widthwise directions. The roller axes on the left portion form a first acute angle 52 with the central axis measured counterclockwise from the central axis. The roller axes on the right portion form a second acute angle 53 with the central axis measured clockwise from the central axis. With this roller arrangement, conveyed articles are directed toward the central axis as indicated by direction arrows 54, 55 perpendicular to the roller axes.

Articles centered by the first conveying mat are received downstream by a second conveyor mat 56 across a deadplate 58 spanning the gap between the two mats. The second conveyor mat in this example is an endless conveyor belt looped around a pair of sprocket sets 24 supported and driven in a similar way to the first conveyor mat. The second conveyor mat is shown as a flat-topped belt, but could have rollers such as those on the first conveyor belt but arranged to rotate about axes in the widthwise direction as indicated by rollers 60 in phantom. If such rollers are in contact with wearstrips acting as roller bearing surfaces, movement of the belt in the conveying direction causes the rollers to rotate in the same direction and propel conveyed articles atop the rollers at twice the forward speed of the second conveyor mat as indicated by the arrow 62. This increase in speed causes conveyed articles to separate themselves in the lengthwise direction. Of course, a flat-top belt operated at a speed greater than the speed of the articles in the conveying direction on the first conveyor mat would achieve a similar separation of articles. Thus, the conveyor exemplified by FIG. 1 aligns articles along the center line of the conveyor and separates them in a lengthwise direction into a single file for downstream processing on an individual basis.

Figure 2:
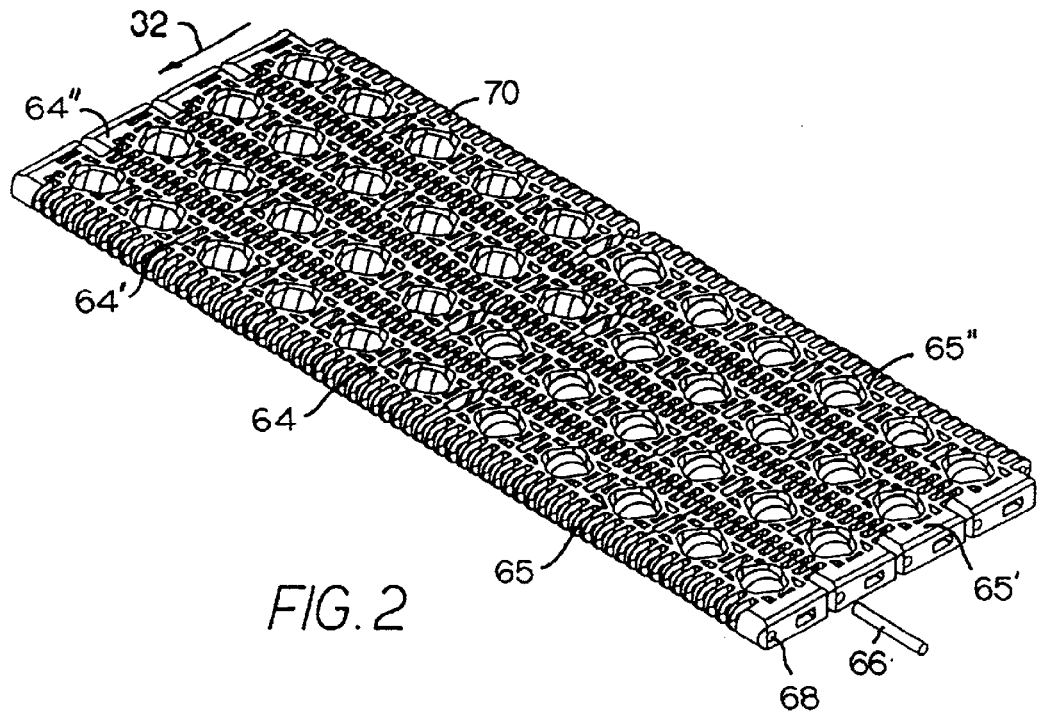
FIG. 2 is an isometric view of a portion of a modular roller-top conveyor belt usable in a singulator conveyor as in FIG. 1.

Details of a portion of the first conveyor mat of FIG. 1 are shown in FIG. 2. The mat is constructed of a series of rows of left-portion roller-top modules 64 and right-portion roller-top modules 65. Each row includes a left-hand edge module (long 64' or short 64") and a right-hand edge module (short 65' or long 65") forming the side edges of the mat. One or more interior modules 64, 65 for each side are used depending on the width of the belt required. Consecutive rows are connected together by connecting pins 66 installed in a passageway formed by aligned holes 68 in interleaved hinge elements 70 along the ends of each row. These mats are preferably constructed in the same manner as modular plastic conveyor belts such as those available from Intralox, Inc. of Harahan, La., USA.

Figure 3A:
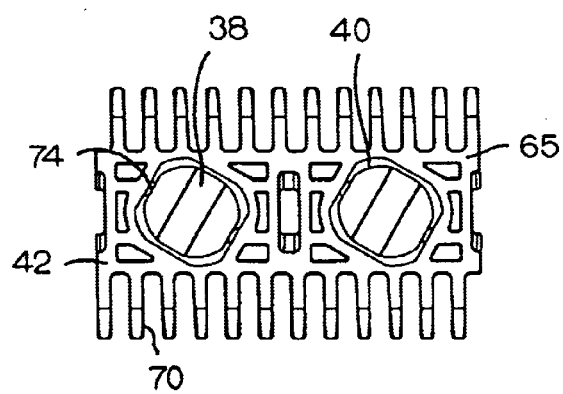
FIGS. 3A, 3B, and 3C are top plan, front elevation, and side elevation views of a belt module used to construct a belt as in FIG. 2.
Figure 3C:
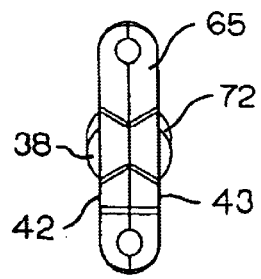
Figure 3B:
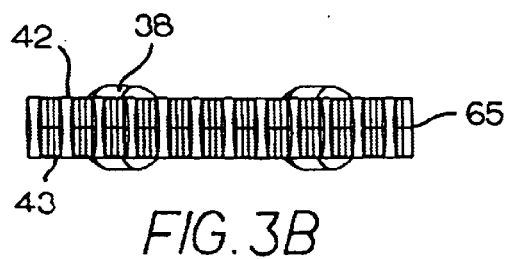

Further details of a right-portion internal roller-top module 65 are shown in FIGS. 3A–C. Rollers 38 mount in cavities 40 formed in the modules. The cavities open onto the top and bottom surfaces 42, 43 of the module. Salient portions of the rollers extend past the top and bottom surfaces. The salient portion 72 at the bottom surface extends far enough so that it can engage roller bearing surfaces, such as provided by wearstrips, in rolling contact to rotate the roller. In this version, the rollers are bored, rounded cylinders mounted on axles 74 along an axis oblique to the lengthwise direction of the module. Hinge elements 70 along each end of the module are spaced apart to interleave with the hinge elements of another such module arranged serially in-line or in bricklay fashion in a conveyor mat.

The plastic modules are preferably made by injection molding. Conventional materials for the modules include polypropylene, polyethylene, nylon, acetal, and composite materials, among others. Typical connecting pin materials include polyethylene, polypropylene, nylon, composite materials, and steel, among others. The roller axles are preferably steel and the rollers themselves, nylon, acetal, or other plastic materials. The rollers could even be coated with rubber or a rubber-like material for better traction on the roller bearing surfaces. The wearstrips are conventionally made of UHMW (ultra-high molecular weight) plastic, but could alternatively be aluminum, steel, nylon, acetal, rubber fabric, or alternating layers of these materials.

Figure 4:
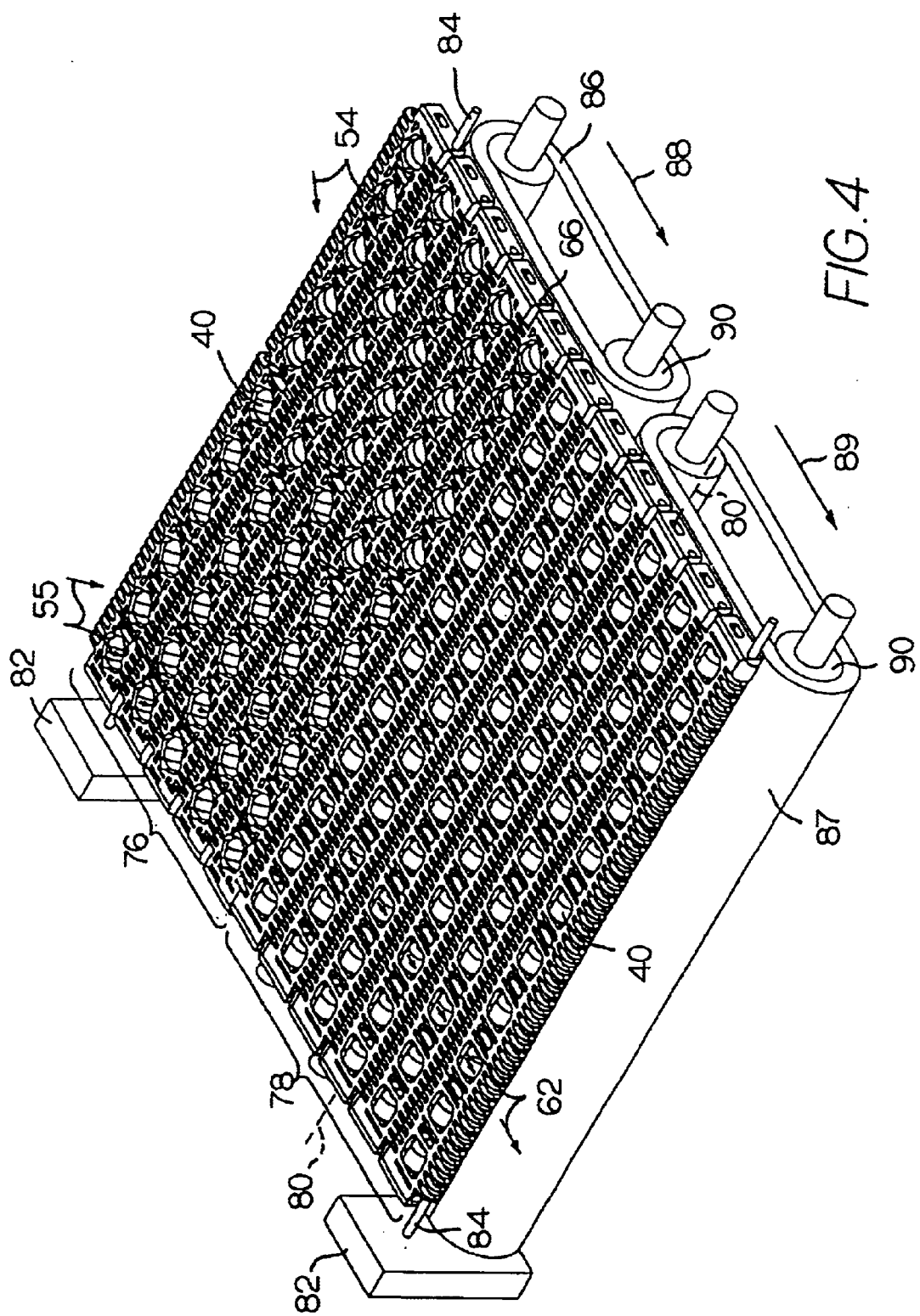
FIG. 4 is an isometric view of a portion of another version of singulator embodying features of the invention including a stationary conveyor mat.

Another version of singulator is shown in FIG. 4. In this version, the first conveyor mat and the second conveyor mat are stationary along the carryway. The first conveyor mat 76 is constructed in the same way as the first conveyor mat in FIGS. 1 and 2, except that it is not an endless belt loop. A second conveyor mat 78 includes a plurality of rollers arranged to rotate about axes 80 in the widthwise direction of the conveyor. In this version, the first conveyor mat and the second conveyor mat are connected together by a connecting pin 66 in the passageway formed by the aligned holes in the interleaved hinge elements 70 at their junction. The free ends of the conveyor mats are attached to the frame 82 by attachment rods 84 through the hinge elements. Of course, the two conveyor mats need not be connected together as shown. Alternatively, they could be separated by a gap spanned by a deadplate as in FIG. 1. The rollers 40 of both mats are set in motion by the motion of moving belts 86, 87 disposed beneath each conveyor mat. The outer surfaces of the moving belts act as roller bearing surfaces contacting the salient portions of the rollers extending below the bottom surfaces of the conveyor mats. As the first moving belt moves as indicated by arrow 88, it causes the rollers on the first conveyor mat to rotate. Because the rollers are arranged as shown to rotate about oblique axes relative to the central lengthwise axis of the first conveyor mat, articles on the mat are provided with a sidewise component of motion toward the center of the first mat as indicated by the arrows 54, 55. Because the rollers on the second conveyor mat rotate about axes in the widthwise direction when they are driven from below by a second moving belt 67 traveling in the direction 89, they propel conveyed articles received from the first conveyor belt in the lengthwise direction indicated by arrows 62. The moving belts 86, 87 beneath the conveyor mats could be fabric belts driven conventionally by pulleys 90 or modular plastic belts with rubber-like conveying surfaces (as in FIG. 5) for better frictional interaction with the rollers. To achieve article separation on the second conveyor mat, the rollers on the second conveyor mat could be driven at more revolutions per minute than the oblique rollers on the centering first conveyor mat. But it would also be possible to drive both running belts at the same speed or to replace the two running belts with a single belt.

Figure 5:
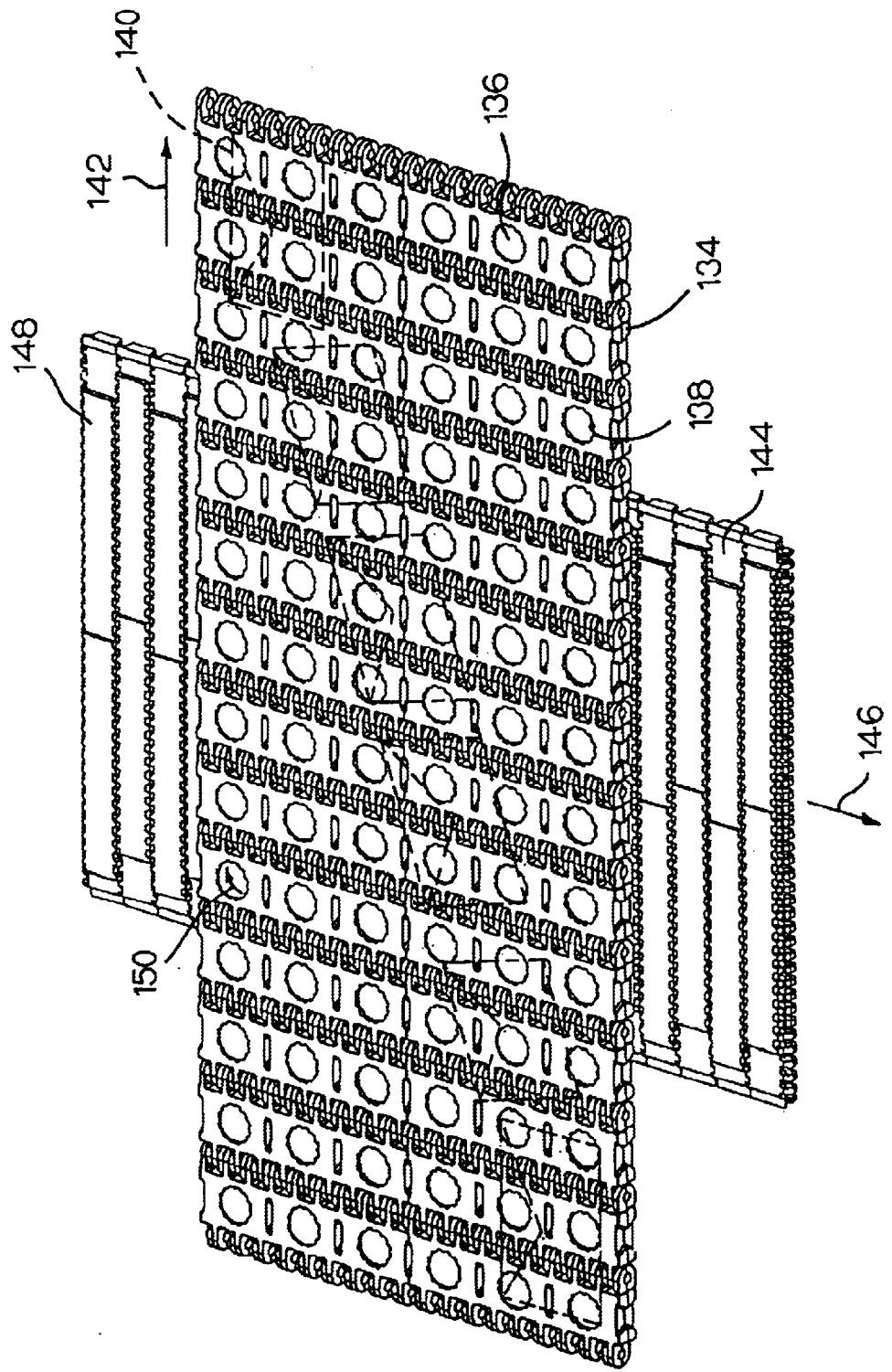
FIG. 5 is an isometric view of a portion of a conveyor mat and a moving belt underneath usable in a singulating conveyor as in FIG. 1.

A conveyor mat 134 with spherical ball rollers 136, instead of cylindrical rollers, is shown in FIG. 5. The ball rollers are retained in cavities 138 formed in the belt modules making up the conveyor mat. In this version, articles 140 ride atop the ball rollers. The conveyor mat travels in the conveying direction 142. A moving belt 144 travels beneath the conveyor mat in the direction given by arrow 146. The moving belt is a modular belt constructed of individual modules in a bricklay pattern. At least portions of the modules include a high-friction, rubber-like layer 148 on the top surface. This high-friction layer serves as a moving roller bearing surface engaging the ball rollers in rolling contact. Depending on the relative directions and speeds of the moving belt and the conveyor mat, the rollers rotate about oblique axes as indicated by arrow 150. In this way the conveyed articles are provided with a sidewise component of motion and pushed across the width of the conveyor mat before being delivered to a downstream conveyor mat or belt operated to separate the articles in the conveying direction. Of course, the ball-roller conveyor mat could be operated instead atop a stationary wearstrip, rather than the moving belt, if the ball rollers rotate on axles arranged along oblique axes, such as perpendicular to the direction of arrow 150.

Figure 6:
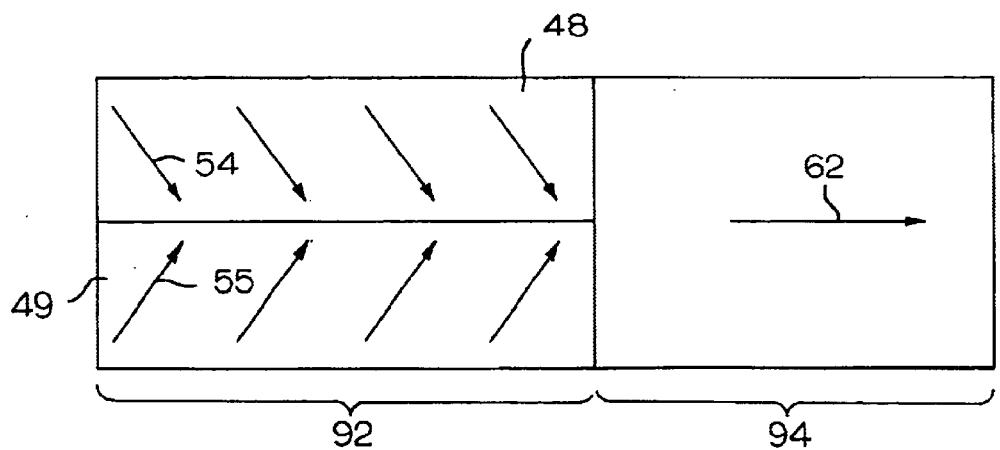
FIG. 6 is an overhead schematic of the singulating conveyor of FIG. 1.

FIGS. 6–11 are schematic diagrams representing overhead views of various singulating conveyor arrangements using components such as those described with reference to FIGS. 1–4. The diagram of FIG. 6 represents the conveyor of FIG. 1 and FIG. 4. The conveyor is divided into a first conveying zone 92 upstream of a second conveying zone 94. The upstream zone is a centering zone in which articles are directed toward the centerline of the conveying zone as indicated by the oblique arrows 54, 55. (The angles of the arrows in FIG. 6 and in all the other overhead schematic diagrams are generally perpendicular to the axes of rotation of rollers on the top surface of conveying mats or belts.) The first conveying zone includes a first conveyor mat or belt having rollers on a left portion 48 rotating about a first oblique axis and rollers on a right portion 49 rotating about a second oblique axis. Preferably, the two are mirror images of each other, i.e., the angle they form with each other is bisected by the centerline of the conveyor, but they could be asymmetrical. The oblique axes are oriented to direct conveyed articles toward the centerline of the first conveying zone. Instead of a single conveyor mat divided into left and right portions, FIG. 6 also represents a pair of side-by-side abutting conveyor mats in which the rollers on one mat are directed in one direction, such as given by arrow 54, and those on the other mat are directed in another direction such as that given by arrow 55. In either case, the result is a centering zone.

The centered articles are delivered to the second conveying zone 94, which may be realized by a flat-top conveyor belt or a roller-top conveyor belt as in FIG. 1 or a stationary roller-top conveyor mat as in FIG. 4. In both cases, articles in the second conveying zone are preferably sped up in the conveying direction 62. This can be accomplished by running the conveyor mat in the second conveying zone at a higher speed than the conveyor mat in the first zone. In this way, article separation can be achieved in the second conveying zone.

Figure 7:
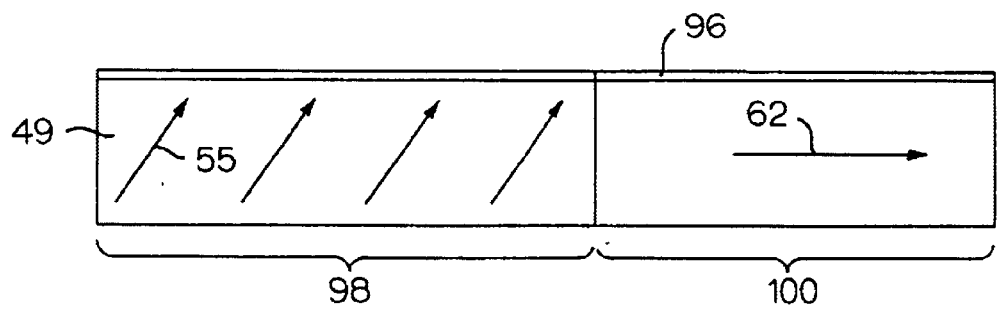
FIG. 7 is an overhead schematic of another version of singulating conveyor embodying features of the invention including alignment along a side of the conveyor.

FIG. 7 is a schematic representation of another version of singulator. Instead of forming a single file of articles along the center of the conveyor, the articles are aligned along a side guard. One way of viewing this version is to think of it as one-half of the version of FIG. 6, but with a side guard 96. In the first conveying zone 98, a first conveyor mat 49 has rollers rotating on parallel, oblique axes to direct all articles in the direction of arrows 55 toward the side guard. The articles are pushed against the side guard before being delivered to the conveyor mat in the second conveying zone 100 for separation. The conveyor mat or belt in the second zone runs preferably at a higher speed than the conveyor mat in the first zone to effect the desired article separation. The side guard could be an integral or detachable portion of the conveyor mat in the first zone or a side guard rail attached to the conveyor frame and positioned to abut the side edge of the conveyor mat. The side guard could extend to or be part of the conveyor mat in the second, separation zone.

Figure 8:
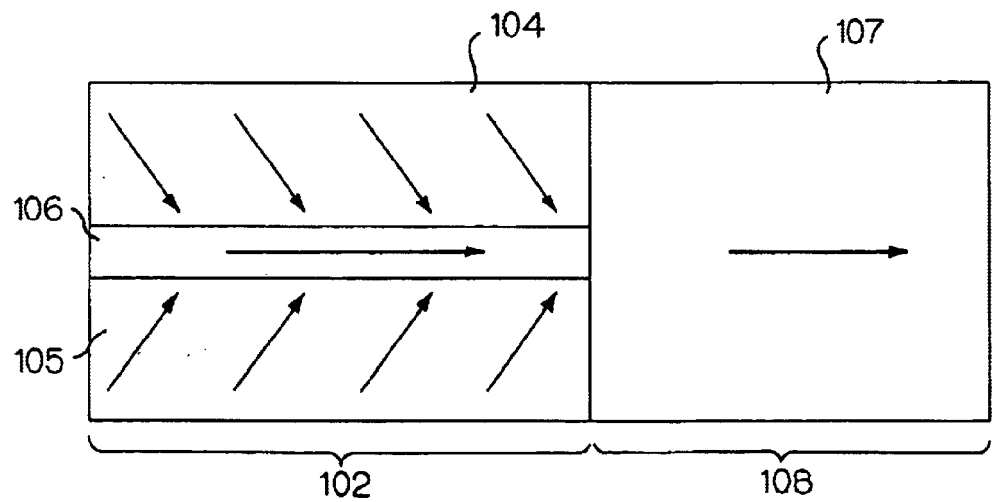
FIG. 8 is an overhead schematic of still another version of singulating conveyor in which a singulating belt is interposed between centering belts.

Another version of singulating conveyor having features of the invention is shown in FIG. 8. Like the conveyor represented by FIG. 6, this conveyor centers articles. The advantage of centering articles rather than aligning them along a side guard is the elimination of the side guard and the interference it causes. A side guard in the form of a stationary rail attached to the conveyor frame engages articles frictionally. This frictional engagement loads the belt drive and can scar the articles. In the case of side guards integral with the conveyor belt or mat, the side guards obstruct side-off transfer and other processing of articles from the side of the conveyor. That's why there are certain advantages to centering singulating conveyors.

As shown in FIG. 8, a first conveying zone 102, the centering zone, includes a pair of parallel conveyor mats or belts 104, 105 with rollers arranged to direct conveyed articles toward a central lengthwise axis, such as the centerline, of the conveyor. Another conveyor belt 106 is positioned parallel to, and between, the two conveyor mats. This belt, which may be driven at a higher speed than the two centering belts, tends to cause centered articles to separate in the first conveying zone. Articles received in a second conveying zone 108 are separated even more. Although the conveyor mat 107 in the second zone could be operated at the same speed as the conveyor belt 106, which will be referred to as a singulator belt, preferably it will be operated at a speed sufficient to separate the articles in the conveying direction. Typically, this speed will be a greater speed, such as 20% greater. The singulator belt 106 can be realized as a fabric belt, a modular plastic belt, or a roller-top mat, for example.

Figure 9:
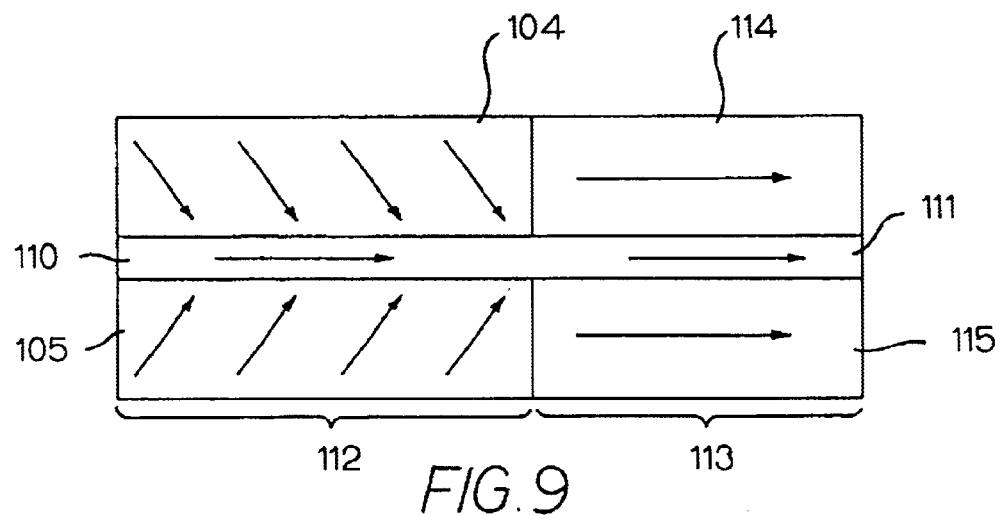
FIG. 9 is an overhead schematic of another version of singulating conveyor in which singulating belts run the length of the conveyor.

In yet another singulator version, shown in FIG. 9, a series of singulator belts 110, 111 extends through the first and second zones 112, 113. The centering belts 104, 105 in the first conveying zone are similar to those in the version in FIG. 8. In the second conveying zone, a pair of separating belts 114, 115 flank the downstream singulating belt 111. The two separating belts and the central singulating belts all speed up centered articles received from the first conveying zone to separate them in the lengthwise direction.

Figure 10:
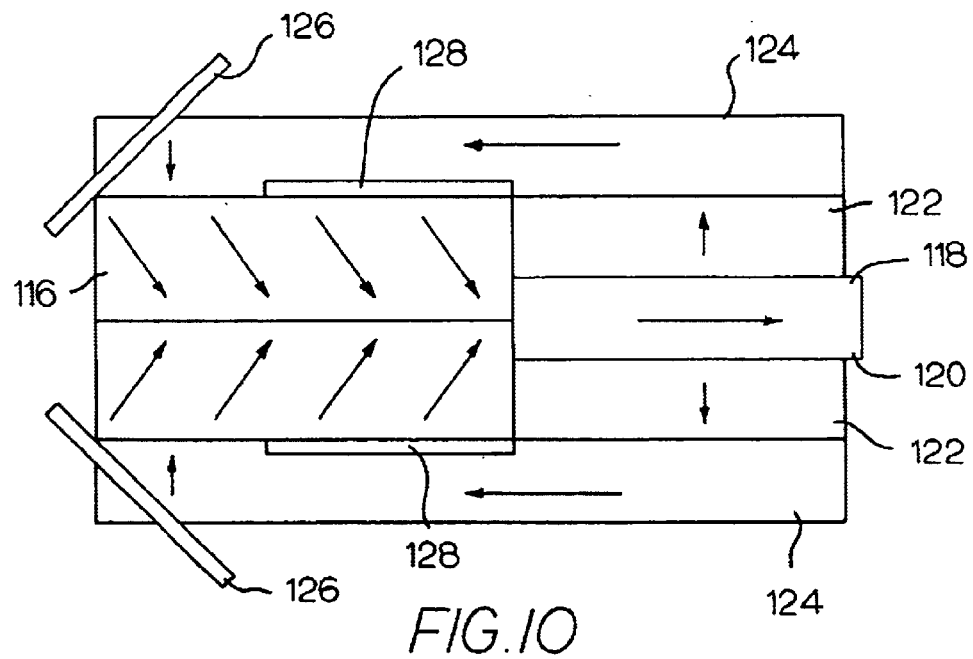
FIG. 10 is an overhead schematic of a singulating conveyor as in FIG. 1 with additional recirculating sections.

If the density of articles conveyed in the first conveying zones of any of the versions described so far is high, some articles will not be centered upon exiting the first conveying zone. The example of FIG. 10 shows one version of a conveying system that ensures articles exit the conveyor in a single file. A first conveying zone 116 is depicted as similar to that in the version of FIG. 6, but could just as well be any of the centering zones already described. The second conveying zone 118 includes a separation conveyor mat or belt 120 whose width is less than the widths of the first conveyor mats or belts composing the first conveying zone. Takeaway belts or chutes 122 receive uncentered articles from the first conveying zone and deposit them on recirculating conveyor belts 124. The recirculating belts convey the uncentered articles back toward the start of the first conveying zone. Deflection bars 126 guide the recirculated articles back into the first conveying zone. Barriers 128 between the recirculating belts and the downstream end of the first conveying zone prevent recirculated articles from prematurely re-entering the first conveying zone.

Figure 11:
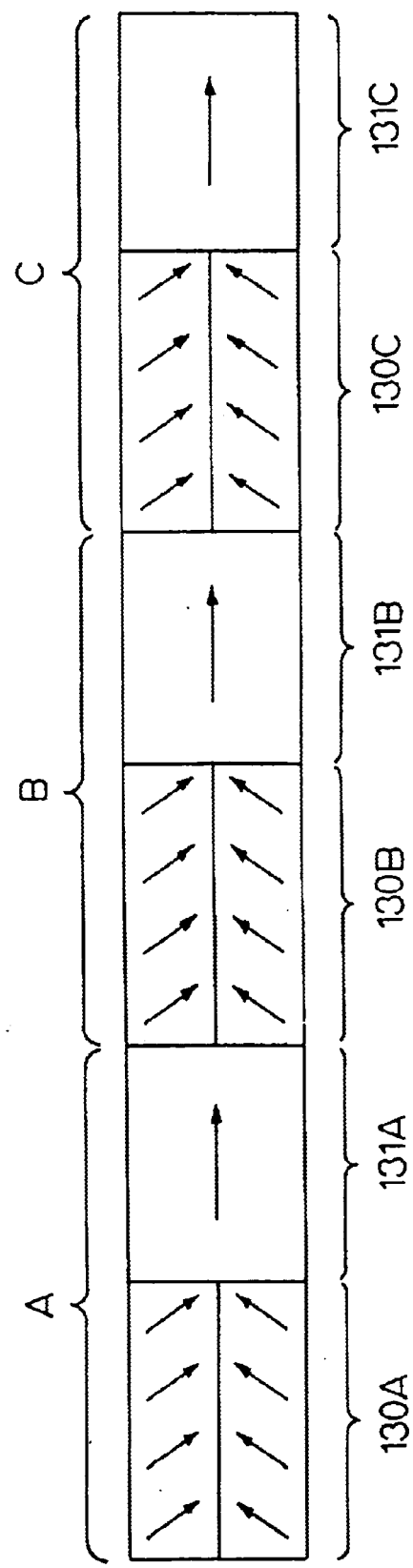
FIG. 11 is an overhead schematic of a singulating conveyor as in FIG. 1 depicting a series of cascaded centering and separating sections.

In the versions depicted in FIGS. 6–10, only a first and a second conveying zone representing generally a centering zone and a separation zone are shown. But it is possible and probably desirable to cascade a series of such zones to single-file conveyed articles. FIG. 11 depicts, for example, a series of three first and second conveying zones 130, 131, laid out end to end. The conveyor mats or belts in each zone can be operated at the same or at different speeds. One way to achieve effective singulation is to incrementally increase the speed along the conveyor. For example, if the speed in the first zone 130A of conveyor section A is S, then the speed in the second zone 131A of conveyor section could be increased by 20% to 1.2S. By increasing the speed in subsequent downstream second zones 131B, 131C by 20%, the speeds in each zone would be set to 130A–S; 131A–1.2S; 130B–1.2S; 131B–1.44S; 130C–1.44S; 131C–1.73S. In this way, the articles can be centered and separated in stages. In this particular example, centering and separation zones alternated. But, as shown in some of the earlier examples that use singulating belts in centering zones, separation can be combined with centering.

Although the invention has been described in detail with reference to a variety of example singulating conveyor versions exhibiting various combinations of features, those skilled in the art will readily recognize that the features could be combined in still other combinations. For example, a series of centering zones, each operating at increasing speeds, could be concatenated without a separation zone between every consecutive pair of centering zones. As another example, a conveyor using centering zones with a central singulator belt could be used without separate separation zones. As these examples suggest, these and other modifications and alternative embodiments are intended to be included within the scope of the invention as defined in the following claims.

What is claimed is:

1. A conveyor suitable for singulating articles conveyed along a carryway, comprising:
   a first conveyor mat extending in a lengthwise direction from a first end to a second end, in a widthwise direction from a first side to a second side, and in thickness from a top surface to a bottom surface;
   the first conveyor mat forming a plurality of cavities through the thickness of the first conveyor mat and opening onto the top surface and the bottom surface;
   a roller disposed in each of the cavities with salient portions of each roller extending from the cavity past the top surface and the bottom surface;
   each roller being arranged to rotate about an axis oriented between the lengthwise and the widthwise direction;
   a roller bearing surracc disposed along the bottom surface of the first conveyor mat and in contact with the salient portion of the rollers extending past the bottom surface;
   wherein relative motion between the first conveyor mat and the roller bearing surface causes the rollers to rotate and to provide a sidewise component of motion to articles conveyed atop the rollers along the top surface of the first conveyor mat; and
   a second conveyor mat adjacent the first conveyor mat arranged to receive articles from the first conveyor mat and to convey the articles at an increased speed in the lengthwise direction to increase the separation between conveyed articles along the carryway.

2. A conveyor as in claim 1 comprising a moving belt forming the roller bearing surface.

3. A conveyor as in claim 1 wherein the second conveyor mat includes a plurality of rollers disposed in cavities formed in the second conveyor mat and opening onto top and bottom surfaces of the mat, salient portions of the rollers extending from the cavities past the top and bottom surfaces, wherein the rollers are arranged in the cavities to rotate about a widthwise axis of Ihe second conveyor mat.

4. A conveyor as in claim 3 further comprising a moving belt positioned beneath the second conveyor mat and in contact with the salient portions of the rollers extending from the cavities past the bottom surface of the second conveyor mat to rotate the rollers to transport articles atop the railers.

5. A conveyor as in claim 1 wherein the first conveyor mat and the second conveyor mat are stationary.

6. A conveyor as in claim 1 wherein the first conveyor mat and the second conveyor mat include rows of belt modules interconnected by connecting pins.

7. A conveyor as in claim 6 wherein the first conveyor mat and the second conveyor mat are arranged end to end and connected one to the other by a connecting pin.

8. A conveyer as in claim 1 wherein the first conveyor mat and the second conveyor mat are endless modular conveyor belts driven to travel in the lengthwise direction along the carryway.

9. A conveyor as in claim 1 wherein the second conveyor mat is positioned to receive articles from the second end of the first conveyor mat.

10. A conveyor as in claim 1 wherein the second conveyor mat is positioned to receive articles from the second aide of the first conveyor mat.

11. A conveyor as in claim 1 wherein the axes of the rollers in the first conveyor mat closer to the first side are parallel to each other and are mirror images of the axes of the rollers closer to the second side about a central lengthwise axis of the first conveyor mat.

12. A conveyor as in claim 1 wherein the rollers in the first conveyor mat are arranged to direct conveyed articles toward the widthwise center of the first conveyor mat.

13. A conveyor as in claim 1 wherein the first conveyor mat moves in the lengthwise direction along the carryway at a speed less than the speed of the second conveyor mat.

14. A conveyor as in claim 1 further comprising a third conveyor mat similar to the first conveyor mat and arranged parallel to the first conveyor mat.

15. A conveyor as in claim 14 wherein the first and third conveyor mats are separated from each other by the second conveyor mat disposed between them and wherein the rollers on each of the first and third conveyor mats are arranged to direct conveyed articles toward the second conveyor mat.

16. A conveyor as in claim 14 further including a center belt disposed between the first and third conveyor mats and wherein the rollers on each of the first and third conveyor mats are arranged to direct conveyed articles toward the center belt.

17. A conveyor as in claim 1 comprising a series of first conveyor mats and second conveyor mats arranged end to end to form a series of first zones in which conveyed articles are shifted in the widthwise direction by the rollers in the first conveyor mats and second zones in which the articles are separated on the second conveyor mats in the lengthwise direction by the increased speed in the lengthwise direction.

18. A conveyor suitable for singulating articles conveyed in a conveying direction along the length of the conveyor, comprising:
   a first conveying zone; and
   a second conveying zone positioned downstream of the first conveying zone in the conveying direction to receive conveyed articles from the first conveying zone;
   the first conveying zone including a first conveyor mat formed of a series of rows of interconnected modules, the modules including rollers for supporting conveyed articles and arranged to rotate about axes oblique to the conveying direction to provide a sideward component of motion transverse to the conveying direction to the conveyed articles;
   the second conveying zone including a second conveyor mat formed of a series of rows of interconnected modules and providing a component of motion in the conveying direction to the conveyed articles received from the first conveying zone greater than the component of motion in the conveying direction in the first conveying zone.

19. A conveyor as in claim 18 further comprising a series of alternating first and second conveying zones in the conveying direction.

20. A conveyor as in claim 19 wherein the component of motion in the conveying direction increases monotonically as articles are conveyed downstream.

21. A conveyor as in claim 18 further including a third conveying zone similar to the first conveying zone, wherein the second conveying zone is disposed between the first conveying zone and the third conveying zone and the third conveying zone provides conveyed articles with a component of motion in the conveying direction greater than the component of motion provided by the second conveying zone.

22. A conveyor as in claim 18 wherein the rollers on one side of a central axis of the first conveyor mat in the conveying direction rotate about axes parallel to a first oblique axis and the rollers on the other side of the central axis rotate about area parallel to a second oblique axis.

23. A conveyor as in claim 22 wherein the first and second oblique axis are mirror images about the central axis.

24. A conveyor as in claim 18 wherein the first conveying zone further includes a third conveyor mat disposed parallel to the first conveyor mat, the third conveyor mat including rollers arranged to rotate about axes oblique to the conveying direction wherein the rollers in the third conveyor mat provide a sideward component of motion to conveyed articles opposite to the sideward component of motion provided by the rollers in the first conveyor mat.

25. A conveyor as in claim 24 further including a conveyor belt disposed parallel to and between the first and third conveyor mats in the first conveying zone.

26. A conveyor as in claim 18 wherein the first conveyor mat in the first conveying zone end the second conveyor mat in the second conveying zone are moving conveyor belt, and the second conveyor mat travels at a speed greater than the speed of the first conveyor mat.

27. A conveyor as in claim is wherein the first conveyor mat is stationary and the conveyor further includes a moving roller bearing surface in contact with the rollers in the first conveyor mat to rotate the rollers.

28. A conveyor suitable for singulating articles conveyed in a conveying direction along the length of the conveyor comprising:
   a centering conveyor belt conveying articles as it travels in the conveying direcuon and having a central axis in the conveying, direction dividing the centering conveyor belt into a left portion and a right portion;
   the centering conveyor belt including rollers on the left portion arranged to rotate about axes forming first acute angles with the central axis measured counterclockwise from the central axis and rollers on the right portion arranged to rotate about axes forming second acute angles with the central axis measured clockwise from the central axis;
   a separation belt arranged downstream of the centering conveyor belt to receive conveyed articles from the centering conveyor belt and operated at a speed to convey articles in the conveying direction faster than the articles are conveyed on the centering conveyor belt.

29. A conveyor as in claim 28 further comprising a roller bearing surface disposed to contact the rollers in the centering conveyor belt to rotate the rollers as the centering belt moves in the conveying direction.

30. A conveyor as in claim 29 wherein the rollers are cylindrical rollers protruding through top and bottom surfaces of the centering conveyor belt to engage the roller bearing surfaces in rolling contact.

31. A conveyor as in claim 29 wherein the rollers are spherical rollers protruding through top and bottom surfaces of the centering conveyor belt to engage the roller bearing surfaces in rolling contact.

32. A conveyor as in claim 28 wherein the first and second acute angles are equal.

33. A conveyor suitable for singulating articles conveyed in a conveying direction along the length of the conveyor, comprising:
- a centering conveyor belt including rollers arranged to rotate about oblique axes as the centering conveyor belt travels in the conveying direction to direct conveyed articles toward a central axis of the centering conveyor belt in the conveying direction;
- a separation conveyor belt arranged downstream of the centering belt and operated to speed up tue conveyed articles received from the centering conveyor belt to separate the articles in the conveying direction.

34. A conveyor suitable for singulating articles conveyed in a conveying direction along the length of the conveyor, comprising:
- a first roller-top conveyor belt disposed on a first side of a conveyor center line and including rollers arranged to rotate about axes parallel to a first oblique axis relative to the conveying direction;
- a second roller-top conveyor belt disposed on an opposite second side of the conveyor center line and parallel to the first roller-top conveyor belt, and including rollers arranged to rotate about axes parallel to a second oblique axis relative to the conveying direction;
- wherein the rollers on the first roller-top conveyor belt and the rollers on the second roller-top conveyor belt direct conveyed articles toward the center line;
- a separation conveyor belt arrangement downstream of the first and second roller-top conveyor belts and operated at a speed to speed up the conveyed articles received from the roller-top conveyor belts to separate the articles in the conveying direction.

35. A conveyor as in claim 34 wherein the first roller-top conveyor belt and the second roller-top conveyor belt abut each other at the center line.

36. A conveyor as in claim 34 further comprising a singulator conveyor belt disposed parallel to and between the first roller-top conveyor belt and the second roller-top conveyor belt and wherein the singulator conveyor belt is operated at a speed to speed up articles received from the roller-top conveyor belts to separate the articles in the conveying direction.

37. A conveyor as in claim 34 wherein the separation conveyor belt arrangement includes a single conveyor belt.

38. A conveyor as in claim 34 wherein the separation conveyor belt arrangement includes a pair of parallel conveyor belts operated at the same speed and a singulator conveyor belt disposed parallel to and between the pair of parallel conveyor belts and operated at a higher conveying speed than the pair of parallel conveyor belts.

39. A conveyor as in claim 34 further comprising a series of singulator conveyor belts extending along the conveyor centerline.

40. A conveyor as in claim 34 wherein the first and second oblique axes are bisected by the conveyor centerline.

41. A conveyor for conveying articles along a carryway, comprising:
- a stationary conveyor mat extending in a lengthwise direction from a first end to a second end, in a widthwise direction from a first side to a second side, and in thickness from a top surface to a bottom surface;
- the conveyor mat forming a plurality of cavities through the thickness of the conveyor mat and opening onto the top surface and the bottom surface;
- a roller disposed in each of the cavities with salient portions of each roller extending from the cavity past the top surface and the bottom surface;
- each roller being arranged to rotate about an axis oriented between the lengthwise and the widthwise directions;
- a roller bearing surface disposed along the bottom surface of the conveyor mat and in contact with the salient portion of tbe rollers extending past the bottom surface;
- wherein the motion of the roller bearing surface causes the rollers to rotate and to provide a sidewise component of motion to articles conveyed atop the rollers along the top surface of the conveyor mat.

42. A conveyor as in claim 41 comprising a moving belt forming the roller bearing surface.

43. A conveyor as in claim 42 wherein the moving belt is a fabric belt.

44. A conveyor as in claim 42 wherein the moving belt is a modular plastic belt.

45. A conveyor as in claim 41 wherein the conveyor mat includes rows of belt modules interconnected by connecting pins.

46. A conveyor as in claim 41 wherein the rollers are selected from the group consisting of cylindrical rollers and spherical ball rollers.

47. A conveyor as in claim 41 comprising first and second moving belts forming the roller bearing surface, wherein the first and second moving belts contact the salient portions of different sets of rollers.

48. A conveyor suitable for positioning articles conveyed along a carryway, comprising:
- a first conveyor mat including a series of rows of interconnected modules;
- the first conveyor mat extending along the carryway in a lengthwise direction from a first end to a second end, in a widthwise direction from a first side to a second side, and in thickness from a top surface to a bottom surface;
- the first conveyor mat forming a plurality of cavities through the thickness of the first conveyor mat and opening onto the top surface and the bottom surface;
- a roller disposed in each of the cavities with salient portions of each roller extending from the cavity past the top surface and the bottom surface;
- each roller being arranged to rotate about an axis oriented between the lengthwise and the widthwise directions;
- a roller bearing surface disposed along the bottom surface of the first conveyor mat and in contact with the salient portion of the rollers extending past the bottom surface;
- wherein relative motion between the first conveyor mat and the roller bearing surface causes the rollers to rotate and to provide a sidewise component of motion to articles conveyed atop the rollers along the top surface of the first conveyor mat.

49. A conveyor suitable for positioning articles conveyed along a carry way, comprising:
- a stationary first conveyor mat including a series of rows of interconnected modules;
- the first conveyor mat extending in a lengthwise direction from a first end to a second end, in a widthwise direction from a first side to a second side, and in thickness from atop surface to a bottom surface;

the first conveyor mat forming a plurality of cavities in selected modules and opening onto the top surface;

a roller disposed in each of the cavities with salient positions of each roller extending from the cavity past the top surface;

each roller being arranged to rotate about an axis oriented between the lengthwise and the widthwise directions;

wherein rotation of the rollers provides a sidewise component of motion to articles conveyed atop the rollers along the top surface of the first conveyor mat.

* * * * *